United States Patent
Hayashi et al.

(10) Patent No.: US 9,426,131 B2
(45) Date of Patent: *Aug. 23, 2016

(54) SERVER APPARATUS AND PROGRAM TO RE-ENCRYPT CIPHERTEXT DATA

(71) Applicants: Kabushiki Kaisha Toshiba, Minato-ku (JP); Toshiba Solutions Corporation, Kawasaki-shi (JP)

(72) Inventors: Ryotaro Hayashi, Kawasaki (JP); Tatsuyuki Matsushita, Kawasaki (JP); Yoshihiro Fujii, Tokyo (JP); Takuya Yoshida, Inagi (JP); Koji Okada, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 122 days.

This patent is subject to a terminal disclaimer.

(21) Appl. No.: 14/219,747

(22) Filed: Mar. 19, 2014

(65) Prior Publication Data
US 2014/0208117 A1  Jul. 24, 2014

Related U.S. Application Data

(63) Continuation of application No. PCT/JP2012/073914, filed on Sep. 19, 2012.

(30) Foreign Application Priority Data
Sep. 30, 2011 (JP) ................................. 2011-217616

(51) Int. Cl.
*H04L 29/06* (2006.01)
*H04L 9/08* (2006.01)
*H04L 9/14* (2006.01)

(52) U.S. Cl.
CPC .......... *H04L 63/0471* (2013.01); *H04L 9/0869* (2013.01); *H04L 9/0894* (2013.01);
(Continued)

(58) Field of Classification Search
CPC ............ H04L 63/0471; H04L 2209/76; H04L 9/0833; H04L 9/0869
See application file for complete search history.

(56) References Cited

U.S. PATENT DOCUMENTS 5,867,579 A   2/1999  Saito
6,002,772 A  12/1999  Saito
(Continued)

FOREIGN PATENT DOCUMENTS

JP   2009-104445 A   5/2009
WO  WO 03/009285 A2  1/2003

OTHER PUBLICATIONS

English translation of the International Preliminary Report on Patentability and Written Opinion issued Apr. 10, 2014, in PCT/JP2012/073914, filed Sep. 19, 2012.
(Continued)

*Primary Examiner* — Linglan Edwards
(74) *Attorney, Agent, or Firm* — Oblon, McClelland, Maier & Neustadt, L.L.P.

(57) ABSTRACT

A server apparatus according to an embodiment generates a random number on receiving from a user apparatus a notification showing that a re-encryption key should be updated, and calculates re-encryption key data on the basis of the re-encryption key stored and the random number generated. The server apparatus transmits the re-encryption key to the user apparatus and receives, from the user apparatus, the user private key not updated yet and re-encryption key updating data calculated from the re-encryption key data on the basis of the user private key updated. The server apparatus calculates the re-encryption key updated, on the basis of the re-encryption key updating data and the random number, and replaces the re-encryption key stored in the storage device with the updated re-encryption key.

6 Claims, 8 Drawing Sheets

(52) U.S. Cl.
CPC ............. *H04L9/0819* (2013.01); *H04L 9/0822* (2013.01); *H04L 9/0825* (2013.01); *H04L 9/0833* (2013.01); *H04L 9/0861* (2013.01); *H04L 9/14* (2013.01); *H04L 2209/76* (2013.01)

(56) References Cited

U.S. PATENT DOCUMENTS

| | | | |
|---|---|---|---|
| 6,128,605 A | 10/2000 | Saito et al. | |
| 6,226,618 B1 | 5/2001 | Downs et al. | |
| 6,263,313 B1 | 7/2001 | Milsted et al. | |
| 6,345,256 B1 | 2/2002 | Milsted et al. | |
| 6,389,403 B1 | 5/2002 | Dorak, Jr. | |
| 6,389,538 B1 | 5/2002 | Gruse et al. | |
| 6,398,245 B1 | 6/2002 | Gruse et al. | |
| 6,408,390 B1 | 6/2002 | Saito | |
| 6,418,421 B1 | 7/2002 | Hurtado et al. | |
| 6,424,715 B1 | 7/2002 | Saito | |
| 6,438,694 B2 | 8/2002 | Saito | |
| 6,574,609 B1 | 6/2003 | Downs et al. | |
| 6,587,837 B1 | 7/2003 | Spagna et al. | |
| 6,611,812 B2 | 8/2003 | Hurtado et al. | |
| 6,741,991 B2 | 5/2004 | Saito | |
| 6,789,197 B1 | 9/2004 | Saito | |
| 6,859,791 B1 | 2/2005 | Spagna et al. | |
| 6,959,288 B1 | 10/2005 | Medina et al. | |
| 6,983,371 B1 | 1/2006 | Hurtado et al. | |
| 7,110,984 B1 | 9/2006 | Spagna et al. | |
| 7,178,038 B2 | 2/2007 | Kamperman et al. | |
| 7,206,748 B1 | 4/2007 | Gruse et al. | |
| 7,228,437 B2 | 6/2007 | Spagna et al. | |
| 7,269,564 B1 | 9/2007 | Milsted et al. | |
| 7,346,580 B2 | 3/2008 | Lisanke et al. | |
| 7,383,228 B2 | 6/2008 | Lisanke et al. | |
| 7,487,128 B2 | 2/2009 | Spagna et al. | |
| 7,590,866 B2 | 9/2009 | Hurtado et al. | |
| 7,646,872 B2 * | 1/2010 | Brown | H04L 63/061 380/277 |
| 7,801,817 B2 | 9/2010 | Saito | |
| 7,827,109 B2 | 11/2010 | Saito | |
| 7,885,411 B2 * | 2/2011 | Little | H04L 9/0841 380/277 |
| 7,894,605 B2 * | 2/2011 | Brown | H04L 63/061 380/277 |
| 7,962,413 B2 | 6/2011 | Lisanke et al. | |
| 7,962,750 B1 | 6/2011 | Gruse et al. | |
| 7,986,785 B2 | 7/2011 | Saito | |
| 8,090,107 B2 * | 1/2012 | Little | H04L 9/0841 380/277 |
| 8,160,256 B2 * | 4/2012 | Yi | H04L 9/3066 380/277 |
| 8,180,708 B2 | 5/2012 | Hurtado et al. | |
| 8,218,773 B2 * | 7/2012 | Brown | H04L 63/061 380/277 |
| 8,233,627 B2 * | 7/2012 | Tanaka | G06Q 20/3829 348/E7.01 |
| 8,238,558 B2 * | 8/2012 | Little | H04L 9/0841 380/277 |
| 8,270,615 B2 * | 9/2012 | Hanaoka | H04L 63/0428 380/277 |
| 8,448,254 B2 | 5/2013 | Saito | |
| 8,595,502 B2 | 11/2013 | Saito | |
| 8,793,496 B2 * | 7/2014 | Burmester | H04L 63/08 713/168 |
| 2002/0112173 A1 | 8/2002 | Saito | |
| 2005/0144478 A1 | 6/2005 | Yamanaka et al. | |
| 2005/0251491 A1 | 11/2005 | Medina et al. | |
| 2007/0079145 A1 | 4/2007 | Saito | |
| 2007/0230705 A1 * | 10/2007 | Hanaoka | H04L 63/0428 380/277 |
| 2008/0172747 A1 | 7/2008 | Hurtado et al. | |
| 2013/0016833 A1 * | 1/2013 | Brown | H04L 63/062 380/44 |
| 2013/0061062 A9 | 3/2013 | Saito | |

OTHER PUBLICATIONS

International Search Report mailed Oct. 23, 2012 for PCT/JP2012/073914 filed Sep. 19, 2012 with English Translation.
International Written Opinion mailed Oct. 23, 2012 for PCT/JP2012/073914 filed Sep. 19, 2012.
G. Ateniese, et al., "Key-Private Proxy Re-Encryption", [online], Cryptology ePrint Archive, Jan. 22, 2009, Report 2008/463. [retrieved on Oct. 9, 2012]. Retrieved from the Internet: <URL: http://eprint.iacr.org/2008/463>.
B. Libert, et al., "Unidirectional Chosen-Ciphertext Secure Proxy Re-encryption", Lecture Notes in Computer Science, 2008, vol. 4939, pp. 360-379.
B. Libert, et al., "Unidirectional Chosen-Ciphertext Secure Proxy Re-Encryption", Proc. PKC 2008, vol. 4939 of LNCS, pp. 360-379, Springer, Mar. 2008.
G. Ateniese, et al. "Improved Proxy Re-Encryption Schemes with Applications to Secure Distributed Storage", Internet Society (ISOC): NDSS 2005, Feb. 2005, pp. 1-25.
Singapore Search and Examination Report issued Feb. 9, 2015 in Patent Application No. 11201400812R.
Extended European Search Report issued Jun. 15, 2015 in Patent Application No. 12837131.7.
Lihua Wang, et al., "New Identity-Based Proxy Re-encryption Schemes to Prevent Collusion Attacks" Pairing-Based Cryptography, XP19158284A, Dec. 1, 2010, pp. 327-346.
Yi-Jun He, et al., "Non-Transferable Proxy Re-Encryption Scheme for Data Dissemination Control" International Association for Cryptologic Research, vol. 20110331:110725, XP61004429A, Mar. 31, 2011, pp. 1-30.

* cited by examiner

SERVER APPARATUS AND PROGRAM TO RE-ENCRYPT CIPHERTEXT DATA

CROSS-REFERENCE TO RELATED APPLICATIONS

This is a Continuation Application of PCT application No. PCT/JP2012/073914, filed on Sep. 19, 2012, which was published under PCT Article 21 (2) in Japanese.

This application is based upon and claims the benefit of priority from Japanese Patent Application No. 2011-217616, filed on Sep. 30, 2011; the entire contents of which are incorporated herein by reference.

FIELD

Embodiments described herein relate generally to a server apparatus and a program.

BACKGROUND

In a file sharing system in which the user uploads a file onto a server apparatus, and that file is shared by a plurality of users, as a method of maintaining the secrecy of file with respect to the server apparatus, the following three methods are used.

(1) An individual key system for encrypting a file by means of an individual encryption key for each user.

(2) A common key system for encrypting a file by means of an encryption key common to respective users.

(3) A re-encryption system for encrypting a file using a proxy re-encryption system.

In the systems (1) to (3), assume that a user A uploads a file onto a server apparatus, and the user A shares the file with users B and C.

In the individual key system (1), each user has a pair of a private key and public key, which are different for each user. The user A encrypts a file by means of a public key of the user B, and uploads the encrypted file onto the server apparatus. Note that the public key of the user B is an individual encryption key for the user B. Likewise, the user A encrypts a file by means of a public key of the user C, and uploads the encrypted file onto the server. The public key of the user C is an individual encryption key for the user C. That is, the user A encrypts a file individually for the users who share that file.

In the common key system (2), each user shares a pair of a private key and public key, which are common to the respective users. The user A encrypts a file by means of a public key (as an encryption key common to the respective users), and uploads the encrypted file onto the server apparatus. The respective users share an identical private key.

In the proxy re-encryption system (3), each user has a pair of a private key and public key, which are different for respective users like in the individual key system (1). However, unlike in the individual key system (1), the user A need only encrypt a file by means of a public key (to be referred to as a group public key hereinafter) of an entity (to be referred to as a group administrator hereinafter) who manages a group of users. The server apparatus re-encrypts the encrypted file (uploaded by the user A) based on a re-encryption key. By the re-encryption, an encrypted file which can be decrypted by each user is generated. Details of the proxy re-encryption system will be described later.

In the individual key system (1), when a file is to be shared also by a new user D, the user A has to encrypt a file by means of a public key of the user D, and has to upload the encrypted file onto the server apparatus, thus posing a problem. Note that the public key of the user D is an individual encryption key for the user D. Therefore, the system (1) is not suitable for the file sharing system since troublesome processing is required at the time of addition of a new user when the number of new users or the number of files to be shared is large.

In the common key system (2), when a file sharing permission for a certain user is canceled from a certain timing (to exclude that user from the file sharing system), a mechanism for updating the private key and public key common to the respective users is additionally required, thus posing a problem. In the common key system (2), if the private key common to the respective users has leaked due to some reason, a person who acquired the leaked private key can decrypt all encrypted files, thus posing a problem. For this reason, the common key system (2) is not suitable for the file sharing system.

On the other hand, in the proxy re-encryption system (3), since the server apparatus re-encrypts one ciphertext to that which can be decrypted by each user, using a re-encryption key, a configuration which does not notify the users of the re-encryption key is adopted, thus solving the aforementioned problems. For this reason, the proxy re-encryption system (3) is suitable for the file sharing system.

In the proxy re-encryption system (3), however, if the user utilizes the file-sharing service provided by a third party (by, for example, accessing a server apparatus via the Internet), he or she cannot rely on the server apparatus so much. It is therefore desired that only the user should generate his or her private key and should hold the private key.

Here arises a problem with the proxy re-encryption system (3). The proxy re-encryption system (3) requires a private key (hereinafter called "group private key") for updating the re-encryption key, which corresponds to the group public key. As a result, the re-encryption key cannot be updated if the group administrator is absent, unless the private key of each user has been disclosed to the group administrator.

Accordingly, an object of this invention is to provide a server apparatus and a program, which can update the re-encryption key even if the private key of each user has not been disclosed to the group administrator and if the group administrator is absent.

DETAILED DESCRIPTION

In general, according to one embodiment, a server apparatus is configured to re-encrypt ciphertext data obtained by encrypting plain text data with an administrator public key, without decrypting the ciphertext data and to store a re-encryption key for obtaining re-encrypted text data able to be decrypted with the user private keys of user apparatuses.

The server apparatus comprises a storage device, a first calculating device, a transmitting/receiving device and second calculating device.

The storage device stores the re-encryption key generated on the basis of an administrator private key associated with the administrator public key and a user public key associated with the user private key.

The first calculating device generates a random number on receiving from the user apparatus a notification showing that the re-encryption key should be updated, and calculates re-encryption key data on the basis of the re-encryption key stored and the random number generated.

The transmitting/receiving device transmits the re-encryption key to a user apparatus and receives, from the user apparatus, the user private key not updated yet and re-encryption key updating data calculated from the re-encryption key data on the basis of the user private key updated.

The second calculating device calculates the re-encryption key updated, on the basis of the re-encryption key updating data and random number, and replaces the re-encryption key stored in the storage device with the updated re-encryption key.

Figure 1:
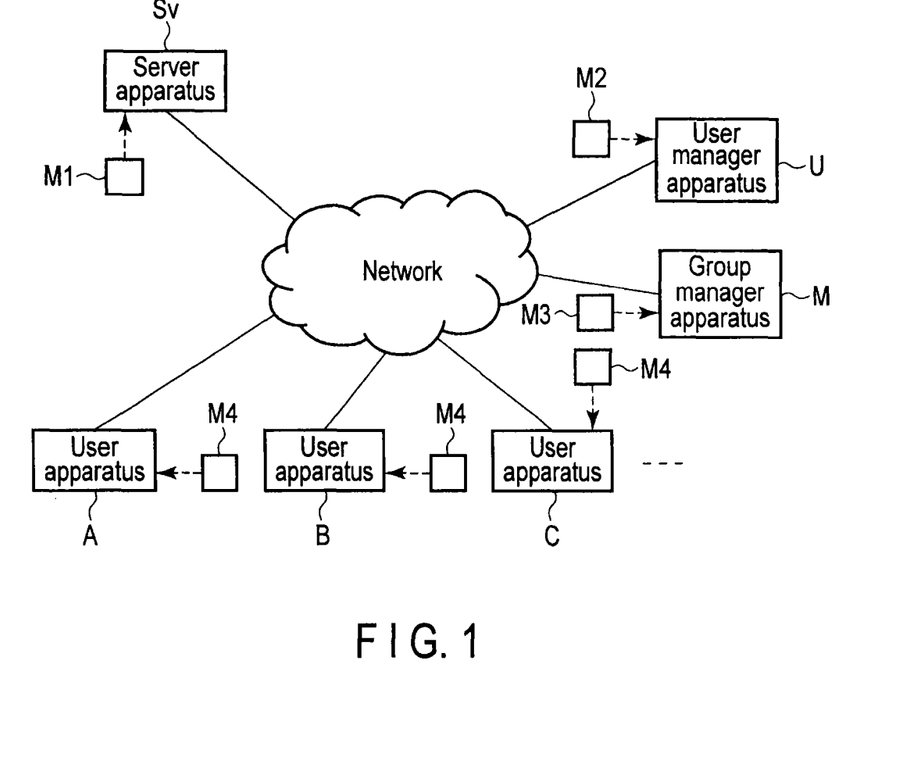
FIG. 1 is a diagram showing an exemplary configuration of a file sharing system according to a first embodiment.
Figure 3:
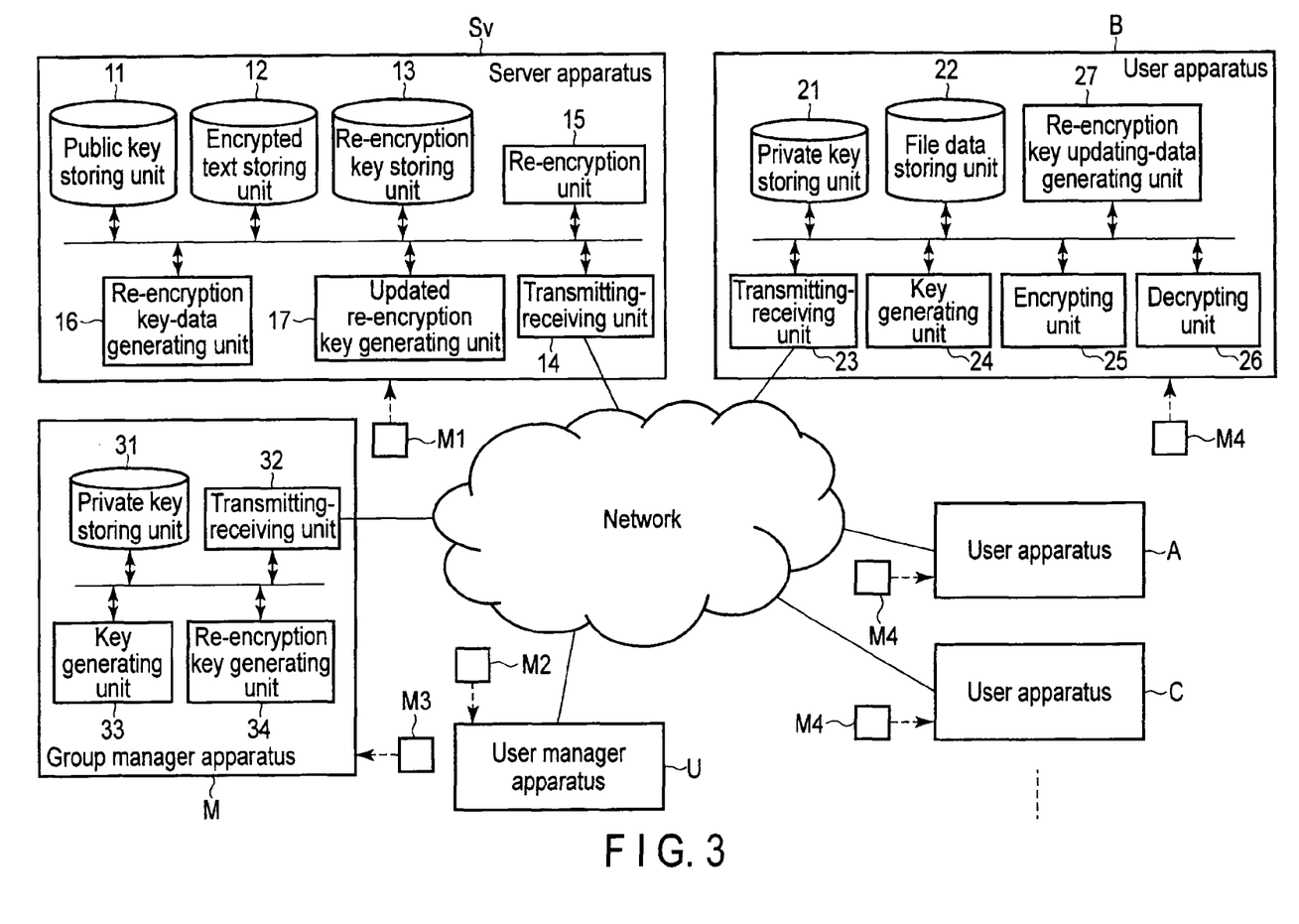
FIG. 3 is a schematic representation of the configurations of the server apparatus, user apparatuses and group administrator apparatus used in the file sharing system according to the first embodiment.

Embodiments will be described hereinafter with reference to the drawings. Note that each of the following apparatuses can be implemented by either a hardware arrangement or a combined arrangement of hardware resources and software. As the software of the combined arrangement, programs, which are installed from a network or non-transitory computer-readable storage media M1 to M4 in a computer in advance, and are executed by processors of the computer to control the computer to implement functions of corresponding apparatuses, as shown in FIGS. 1 and 3, are used.

First Embodiment

A proxy re-encryption system will be described first. A basic model of the proxy re-encryption system includes five functions (to be also referred to as algorithms hereinafter), that is, key generation, encryption, decryption, re-encryption key generation, and re-encryption. The key generation, encryption, and decryption functions are the same as those of normal public key cryptosystem.

(Key generation)KeyGen($1^k$)→($pk,sk$)

A key generation algorithm KeyGen outputs a pair (pk, sk) of a public key pk and private key sk when a security parameter $1^k$ is input.

(Encryption)Enc($pk_A,m$)→$C_A$

An encryption algorithm Enc outputs ciphertext $C_A$ for a user A when a public key $pk_A$ of the user A and a message m are input.

(Decryption)Dec($sk_A, C_A$)→$m$

A decryption algorithm Dec outputs the message m when a private key $sk_A$ of the user A and the ciphertext $C_A$ for the user A are input.

(Re-encryption key generation)ReKeyGen($pk_A,sk_A,$
   $pk_B,sk_B$)→$rk_{A→B}$

A re-encryption key generation algorithm ReKeyGen outputs the re-encryption key $rk_{A→B}$ when the public key $pk_A$ of the user A, the private key $sk_A$ of the user A, a public key $pk_B$ of a user B, and a private key $sk_B$ of the user B are input.

(Re-encryption)ReEnc($rk_{A→B}, C_A$)→$C_B$

A re-encryption algorithm ReEnc outputs ciphertext $C_B$ for the user B when the re-encryption key $rk_{A→B}$ and the ciphertext $C_A$ for the user A are input.

The basic model has been described. However, according to the re-encryption implementation method used, models having different inputs to functions, and those including functions and keys other than those described above have also been proposed.

For example, a model called "non-interactive", which obviates the need for the private key $sk_B$ of the user B in inputs of the re-encryption key generation algorithm has been proposed. Also, a model in which the re-encryption key $rk_{A→B}$ for the user B and a private key $sk_C$ of a user C are input in place of the private key $sk_A$ of the user A has also been proposed.

In addition, a model called "unidirectional" which allows re-encryption of ciphertext $C_A→C_B$ by means of the re-encryption key $rk_{A→B}$, while inhibits inverse conversion of ciphertext $C_B→C_A$, and a model called "bidirectional" which permits that inverse conversion are known. Note that in the bidirectional model, the re-encryption key $rk_{A→B}$ is also expressed as $rk_{A↔B}$.

Furthermore, a system based on ID-based encryption of the public key cryptosystem has been proposed. In this case, function setup processing is added for master key generation, and a master key and ID are added to inputs of the key generation algorithm. In the ID-based encryption, the public key pk is an ID itself.

The configuration of the file sharing system according to this embodiment will be described with reference to FIG. 1. The file sharing system comprises a server apparatus Sv, user apparatuses A, B, C, . . . (hereinafter referred to as "users" in some cases), user administrator apparatuses U (hereinafter referred to as "user administrators" in some cases), and a group administrator apparatus M (hereinafter referred to as "group administrator"). The server apparatus Sv is the data processing apparatus of the provider who provides service. The user apparatuses U are data processing apparatuses of the users who receive the service. These components are connected to one another by a communication network. The communication network is, for example, a wireless LAN (Local Area Network), a wired LAN, an optical network, a telephone network, an intranet, the Ethernet (registered trademark) or the Internet, or any possible combination of these networks. In FIG. 1, one server apparatus Sv and three user apparatuses A, B and C are shown. Nonetheless, the file sharing system may have more server apparatuses and more user apparatuses.

Figure 2:
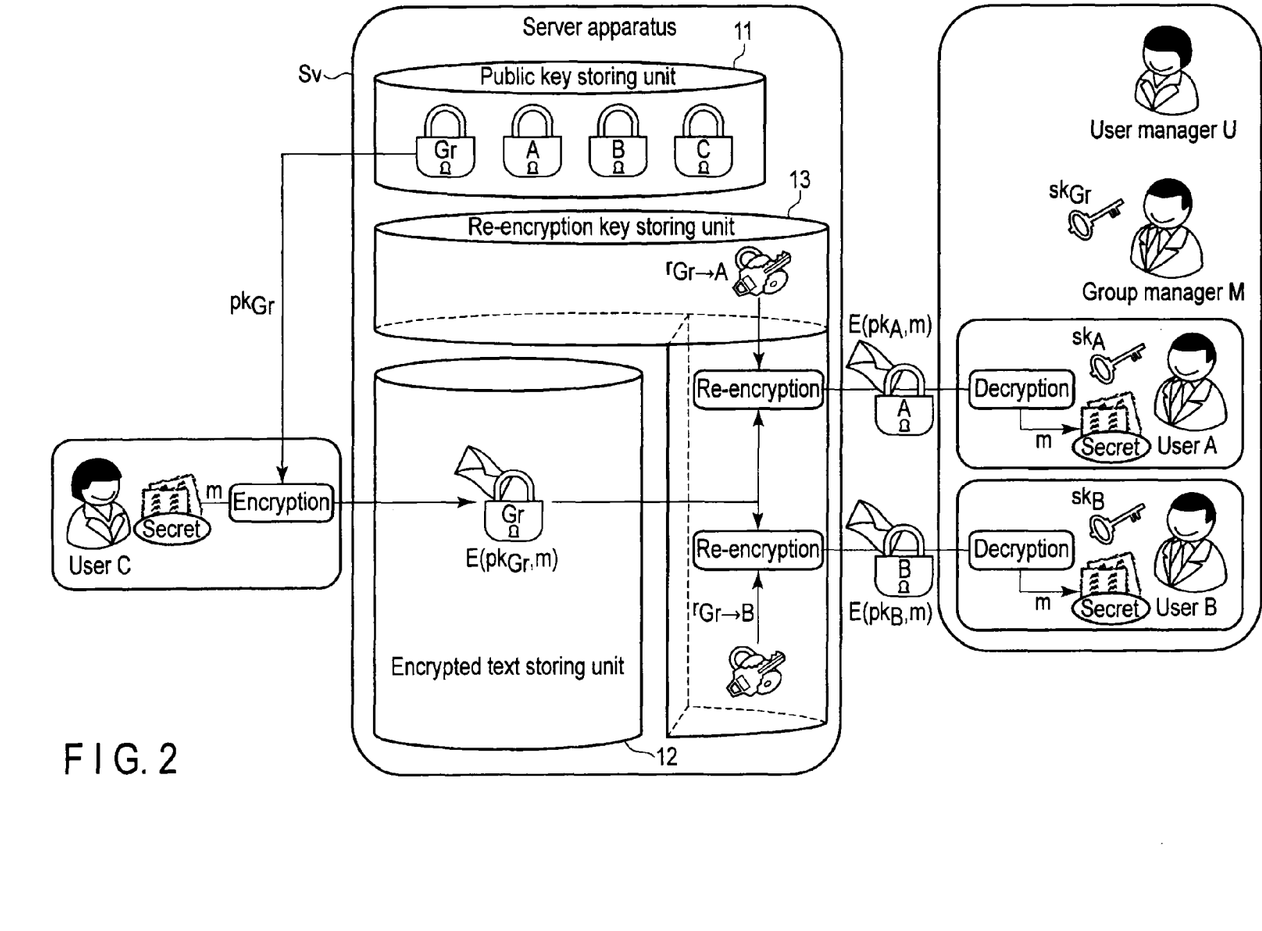
FIG. 2 is a schematic representation of the overall configuration of the file sharing system according to the first embodiment.

FIG. 2 is a schematic representation of the overall configuration of the file sharing system. The file sharing system comprises a server apparatus Sv, user A, user B, user C, a group administrator M, and a user administrator U. The user administrator U is the entity that manages all users. The user administrator U issues IDs and initial passwords to the user apparatuses A, B and C, respectively, enabling the user apparatuses A, B and C to log into the file sharing system.

As an advance preparation, assume that each user A, B, C, . . . has a public key $pk_{Gr}$ of the group administrator. Also, let m be file of plaintext to be shared. Assume that the server apparatus Sv has a re-encryption key $rk_{Gr→A}$ (or $rk_{Gr→B}$ or $rk_{Gr→C}$) required to re-encrypt ciphertext E($pk_{Gr}$, m) for the group administrator to ciphertext E($pk_A$, m) (or E($pk_B$, m) or E($pk_C$, m)) for the user A (or the user B or user C). Assume that each user i has a private key $sk_i$. That is, the user A has a private key $sk_A$, the user B has a private key $sk_B$, and the user C has a private key $sk_C$.

Next, the user C encrypts the file m by means of the public key $pk_{Gr}$ of the group administrator, which is stored in a public key storage unit 11, and uploads obtained ciphertext $E(pk_{Gr}, m)$ onto the server apparatus Sv. The server apparatus Sv stores this ciphertext in a ciphertext storing unit 12.

Now assume that the user A wants to share the file m. The user A transmits a re-encryption request of the ciphertext $E(pk_{Gr}, m)$ to the server apparatus Sv. In response to the request received from the user A, the server apparatus Sv re-encrypts the ciphertext $E(pk_{Gr}, m)$ to ciphertext $E(pk_A, m)$ for the user A based on the re-encryption key $rk_{Gr \to A}$ for the user A stored in a re-encryption key storing unit 13, and transmits the obtained re-encrypted text $E(pk_A, m)$ to the user A. Note that the re-encrypted text is ciphertext obtained by re-encrypting ciphertext without decrypting the same.

The user A decrypts the re-encrypted text $E(pk_A, m)$ downloaded from the server apparatus Sv by means of the private key $sk_A$ in his or her possession, and uses the obtained file m.

In the aforementioned file sharing system, the file m has never been decrypted from encryption by the user C until decryption by the user A, thus blocking information leakage during the processes of file sharing.

The user C need not determine file sharing users at the ciphertext upload timing. That is, the user C need only encrypt the file m by means of the public key $pk_{Gr}$ of the group administrator, and requires only the public key $pk_{Gr}$ of the group administrator as a key to be managed in association with encryption, thus reducing the key management cost.

In this file sharing system, the server apparatus Sv does not have any decryption key $sk_{Gr}$ required to decrypt the ciphertext $E(pk_{Gr}, m)$. Therefore, the server apparatus Sv cannot decrypt this ciphertext. This means that there is no threat of leakage of ciphertext decrypted by the illicit server apparatus Sv, thus the server apparatus Sv need not be managed so strictly, resulting in a management cost reduction of the server apparatus Sv.

The same applies to a case of file sharing by the user B.

FIG. 3 is a schematic representation of the configurations of the server apparatus, user apparatuses and group administrator apparatus used in the file sharing system. Of the key setup processes (encryption process (2), re-encryption key generating process (3), re-encryption process (4), decryption process (5) and re-encryption key updating process (6)), the re-encryption key updating process (6) will be explained in main. The other processes (1) to (5) are disclosed in Libert and D. Vergnaud, "Unidirectional Chosen-Ciphertext Secure Proxy Re-encryption," Proc. PKC 2008, LNCS 4939, pp. 360-379, Springer, 2008 (hereinafter, referred to as Non-Patent Literature 1).

The server apparatus Sv stores a re-encryption key. The re-encryption key is used to re-encrypt ciphertext data with the private key of the user apparatus (hereinafter called "user private key"), without decrypting the ciphertext data acquired by encrypting plain text data with the group administrator's pubic key (also called "administrator public key," hereinafter).

More specifically, the server apparatus Sv comprises a public key storing unit 11, a ciphertext storing unit 12, a re-encryption key storing unit 13, a transmitting-receiving unit 14, a re-encryption unit 15, a re-encryption key-data generating unit 16, and an updated re-encryption key generating unit 17.

The public key storing unit 11 is a storage unit from and to which the unit 14 to 17 can read and write date, and which stores the public keys of the respective users and also the public key of the group administrator.

The ciphertext storing unit 12 is a storage unit from and in which the units 14 to 17 can read and write data, and which stores the ciphertext the user has up-loaded.

The re-encryption key storing unit 13 is a storage unit from and to which the units 14 to 17 can read and write data. The re-encryption key storing unit 13 stores the private key x (also called "administrator private key," hereinafter) associated with the group administrator public key $g^x$, and the re-encryption key R ($=D^{\{1/x\}}=g^{\{pw/x\}}$, where ^ is power) generated on the basis of the public key D (also called "user public key," hereinafter). In the re-encryption key storing unit 13, the re-encryption key R not updated yet can be replaced (or written over) by the re-encryption key W updated.

The transmitting-receiving unit 14 is the interface between the server apparatus Sv and the network. The transmitting-receiving unit 14 has the function of transmitting the re-encryption key data Y ($=R^{\wedge}h$) calculated (generated) by the re-encryption key-data generating unit 16 to the user apparatus (e.g., apparatus B), and the function of receiving the re-encryption key updating data Z ($=Y^{\{d/pw\}}=g^{\{d \cdot h/x\}}$) calculated from the re-encryption key data Y, on the basis of the user private key pw and updated user private key d received from the user apparatus. For simplicity of explanation, the data transmission and reception via the transmitting-receiving unit 14 will not be described, as needed.

The re-encryption unit 15 re-encrypts the ciphertext with the re-encryption key stored in the re-encryption key storing unit 13. The process performed in the re-encryption unit 15 will be described later in detail.

The re-encryption key-data generating unit 16 has the function of generating a random number h when it receives, from the user apparatus B, a notification showing that the re-encryption key R will be updated. The re-encryption key-data generating unit 16 also has the first calculating function of calculating re-encryption key data Y ($=R^{\wedge}h$) on the basis of the re-encryption key R stored in the re-encryption key storing unit 13 and the random number h it has generated.

The updated re-encryption key generating unit 17 has two functions. On function is to calculate an updated re-encryption key W ($=Z^{\{1/h\}}=g^{\{d/x\}}$) on the basis of the re-encryption key updating data Z ($=Y^{\{d/pw\}}=g^{\{d \cdot h/x\}}$) received by a transmitting-receiving unit 23 and the random number h generated by the re-encryption key-data generating unit 16. The other function is to replace the re-encryption key R stored in the ciphertext storing unit 12 with the updated re-encryption key W.

Note that the re-encryption key R is the data the server apparatus Sv uses to calculate re-encryption key data Y ($=R^{\wedge}h$) on the basis of the random number h.

The re-encryption key data Y is data the user apparatus B uses to calculate the re-encryption key updating data Z ($=Y^{\{d/pw\}}=g^{\{d \cdot h/x\}}$) on the basis of the user private key pw and the updated user private key d.

The re-encryption key updating data Z is data from which the server apparatus Sv calculates the updated re-encryption key W ($=Z^{\{1/h\}}=g^{\{d/x\}}$) on the basis of the random number h.

The updated re-encryption key W is replaced by the server apparatus Sv from the re-encryption key R not updated yet, and is then stored.

The user apparatuses A, B, C, . . . are identical in hardware configuration. Hereinafter, the user apparatus B, for example, will be described.

The user apparatus B comprises a private key storing unit 21, a file data storing unit 22, a transmitting-receiving unit 23, a key generating unit 24, an encrypting unit 25, a decrypting unit 26, and a re-encryption key updating-data generating unit 27.

The private key storing unit 21 is a storage unit from and to which data can be read and written by each of the components 23 to 27. The private key storing unit 21 stores the user private key pw not updated yet and associated with the user public key D=g^{pw} not updated yet, and also the user private key d associated with the updated user public key g^d.

The file data storing unit 22 is a storage unit from and to which data can be read and written by each of the components 23 to 27. The file data storing unit 22 stores file data.

The transmitting-receiving unit 23 is the interface between the user apparatus B and the network. The transmitting-receiving unit 23 has the function of transmitting to the server apparatus Sv a notification showing that the re-encryption key R (=D^{1/x}=g^{pw/x}) should be updated, and the function of receiving from the server apparatus Sv the re-encryption key data Y (=R^h) calculated on the basis of the re-encryption key R and random number h. The transmitting-receiving unit 23 also has the function of transmitting to the server apparatus Sv the re-encryption key updating data Z (=y^{d/pw}=g~{d·h/x}) calculated by the re-encryption key updating-data generating unit 27. For simplicity of explanation, the data transmission and reception via the transmitting-receiving unit 23 will not be described, if unnecessary.

The key generating unit 24 generates a pair of public key and private key. The key generating unit 24 holds parameters required in generating keys. Each of the parameters for generating keys will be described later.

The encrypting unit 25 uses the public key received from the server apparatus Sv via the transmitting-receiving unit 23 (or the group administrator public key already received and stored in the user apparatus B), thereby encrypting the file data stored in the file data storing unit 22.

The decrypting unit 26 uses the user's private key stored in the private key storing unit 21, decrypting a re-encrypted text (or ciphertext).

The re-encryption key updating-data generating unit 27 has the function of calculating re-encryption key updating data Z (=Y^{d/pw}=g~{d·h/x}) from the re-encryption key data Y, on the basis of the re-encryption key data Y (=R^h) received from the transmitting-receiving unit 23, the user private key pw not updated yet and the user private key d updated.

The group administrator apparatus M comprises a private key storing unit 31, a transmitting-receiving unit 32, a key generating unit 33, and a re-encryption key generating unit 34.

The private key storing unit 31 is a storage unit from and to which data can be read and written by the components 32 to 34, and stores the group administrator private key x generated by the key generating unit 33.

The transmitting-receiving unit 32 is the interface between the group administrator apparatus M and the network. It has the function of transmitting, to the server apparatus Sv, the group administrator public key g^x generated by the key generating unit 33. It also has the function of receiving the user public key D (=g^{pw}) of the user apparatus B from the server apparatus Sv, and transmitting the re-encryption key R generated by the re-encryption key generating unit 34 to the server apparatus Sv.

The key generating unit 33 generates a pair of a public key and a private key. The key generating unit 33 holds parameters required for generating keys.

The re-encryption key generating unit 34 has the function of generating (issuing) a re-encryption key R (=D^{1/x}=g^{pw/x}) on the basis of the user public key D (=g^{pw}) received by the transmitting-receiving unit 32 and the administrator private key x stored in the private key storing unit 31. In an aspect of this embodiment, the server apparatus Sv can update the re-encryption key R to updated re-encryption key W, without using the group administrator private key x, in the case where the group administrator is absent.

Next, how the re-encryption system configured as described above operates will be explained. As described below, the system performs a (1) key setup process, (2) encryption process, (3) re-encryption key generating process, (4) re-encryption process, (5) decryption process, and (6) re-encryption key updating process, in the order they are mentioned. Nonetheless, these processes need not be performed in this order. The re-encryption key generating process, for example, may be performed prior to the encryption process. Further, the re-encryption process may not be performed, and the ciphertext may be decoded instead. Note that the processes (1) to (5) are disclosed in Non-Patent Literature 1. The process (6), i.e., re-encryption key updating process, is specific to this embodiment. Thus, the processes other than process (6), i.e., processes (1) to (5) can be well understood, with reference to Non-Patent Literature 1.

(1) Key Setup Process

First, the key generating unit 33 generates public parameters (p, λ, G, $G_T$, g, u, v and Sig), or acquires these parameters from outside (ST1). Here, λ is a security parameter; p is a prime number satisfying p>2λ; G and $G_T$ are bilinear map groups that satisfy the prime order, p>2λ; g, u and v are generators of G (namely, g, u, v∈G); and Sig expresses a one-time signature algorithm Sig($\hat{G}$, $\hat{S}$, $\hat{V}$) which satisfies strong unforgeability. Also, in the one-time signature algorithm Sig($\hat{G}$, $\hat{S}$, $\hat{V}$) (to be also referred to as "sig" hereinafter), $\hat{G}$ means a function of generating a one-time key pair (ssk, svk), $\hat{S}$ means a function of generating a signature σ for a message M, and $\hat{V}$ means a function of verifying authenticity of the signature σ.

The one-time signature is described in detail in [A. Menezes, P. van Oorschot, S. Vanstone, "Handbook of Applied Cryptography," CRC Press, (1996)].

The bilinear map (to be expressed by "e") is a map e: G×G→$G_T$, and satisfies the following three properties.

1. For arbitrary (g, h)∈G×G and a, b∈Z, $e(g^a, h^b)=e(g, h)^{ab}$ holds where Z is a set of integers.

2. For arbitrary (g, h)∈G×G, e(g, h) is calculable.

3. When g, h≠$1_G$, e(g, h)≠$1_{GT}$ always holds where $1_G$ is a unit member of G, and $1_{GT}$ is a unit member of $G_T$.

The bilinear map groups (expressed by G and $G_T$) are groups of prime orders p including the bilinear map e: G×G→$G_T$. If $g_1=g^\alpha$ and $g_2=g^\beta$ for the members g, $g_1$, and $g_2$ of G, the aforementioned definition means that the following equation holds:

$$e(g_1g_2, g) = e(g, g_1g_2) = e(g, g^\alpha \cdot g^\beta) = e(g, g^{\alpha+\beta})$$
$$= e(g, g)^{\alpha+\beta} = e(g, g)^\alpha \cdot e(g, g)^\beta$$

(where α and β are power indices related to the members g, $g_1$, and $g_2$ of G).

Note that the plurality of members g, $g_1$, and $g_2$ of G are a plurality of predetermined system fixed values. The plurality of system fixed values are not limited to the three members of the bilinear map group G, and a plurality of members (for example, two or four or more members) of G can be used as needed. The term "system fixed value" may be read as "fixed value", "member", or "system parameter". The plurality of system fixed values are a plurality of members of a bilinear map group as a group of prime orders including a bilinear map.

This specification adopts a notation which assumes both G and $G_T$ as multiplicative groups. However, the present invention is not limited to this, and G and $G_T$ can be expressed by a notation which regards them as additive groups. That is, for example, G may be expressed as an additive group, and $G_T$ may be expressed as a multiplicative group. As the bilinear map, a map e: $G_1 \times G_2 \to G_T$ for bilinear map groups $G_1$, $G_2$, and $G_T$ ($G_1$ and $G_2$ are different groups) may be used. The same applies to other embodiments.

The key generating unit 33 stores the public parameters (p, λ, G, $G_T$ g, u, v, Sig) mentioned above.

Letting i be identification information of the user, the key generation unit 33 generates a private key $x_i \epsilon Z_p^*$, and generates a public key $X_i = g^{x_i}$ of the user i.

Note that $Z_p^*$ is a set of integers (=(Z/pZ)*) which are coprime to $Z_p$ and p, and may also be called a multiplicative group $Z_p^*$ for the prime p. $Z_p$ is a set (=(Z/pZ)) of integers not less than 0 and less than p.

The private key $x_i$ of the user i is stored in the private key storing unit 21, and the public key $X_i$ is stored in the public key storing unit 11 of the server apparatus Sv. The private key and public key of the group administrator are similarly generated in the key generating unit 33.

(2) Encryption Process

The encrypting unit 25 generates a key pair (ssk, svk)$\leftarrow \hat{G}$ (λ) of a signature key ssk and verification key svk in the one-time signature using the security parameter λ and the key pair generation function $\hat{G}$ in the public parameters, and sets the verification key svk in encrypted data $C_1$ ($C_1$=svk).

The encrypting unit 25 generates first random number $r \epsilon Z_p^*$. The encrypting unit 25 generates second, third and fourth encrypted data $C_2$, $C_3$, and $C_4$ for a message $m \epsilon G_T$ as plaintext data on the basis of the random number r. These encrypted data are respectively given by:

$$C_2 = X_i^r$$

$$C_3 = e(g,g)^r \cdot m$$

$$C_4 = (u^{svk} \cdot v)^r$$

To be more specific, the encrypting unit 25 generates the second encrypted data $C_2$ on the basis of the public key $X_i$ of the user i and the first random number r. The encrypting unit 25 then generates the third encrypted data $C_3$ with a pairing function on the basis of the generator g in the public parameter, the first random number r and the message m. Further, the encrypting unit 25 generates the fourth encrypted data $C_4$ on the basis of the generators u and v included in the public parameters, the verification key svk generated as described above, and the first random number r.

The encrypting unit 25 generates, for the third and the fourth encrypted data $C_3$ and $C_4$, a one-time signature a by means of the signature generation function $\hat{S}$ in the public parameters and the signature key ssk generated, as described above. The signature a is described by:

$$\sigma = \hat{S}(ssk,(C_3,C_4))$$

The ciphertext obtained in the encryption process described above is ciphertext $C_i$ that contains the first to fourth data $C_1$ to $C_4$, the one-time signature σ. Thus, $C_i = (C_1, C_2, C_3, C_4, \sigma)$.

(3) Re-Encryption Key Generating Process

The re-encryption key generating unit 34 generates a re-encryption key $R_{ij}$ based on the private key $x_i$ stored in the private key storing unit 31 (i.e., the group administrator private key in this embodiment) and the public key $X_j$ of the user j. The re-encryption key $R_{ij}$ is described by:

$$R_{ij} = X_j^{1/x_i} = g^{x_j/x_i}$$

The re-encryption key $R_{ij}$ will be used to re-encrypt the ciphertext addressed to the user i to a re-encrypted text addressed to the user j.

(4) Re-Encryption Key Generating Process

How the ciphertext addressed to the user i is re-encrypted to a re-encrypted text addressed to the user j will be explained. The re-encryption unit 15 verifies the ciphertext $C_i$ acquired in the encryption process, by using the public parameters and the following verification equations. If the two verification equations are established, the verification will be successful. Unless both equations are established, the verification will fail.

$$e(C_2, u^{C_1} \cdot v) \stackrel{?}{=} e(X_i, C_4)$$

$$\hat{V}(C_1, \sigma, (C_3, C_4)) \stackrel{?}{=} 1$$

If the verification ends in success, the re-encryption unit 15 generates second random number $t \epsilon Z_p^*$. The re-encryption unit 15 then uses the ciphertext $C_i$ acquired in the encryption process and the re-encryption key $R_{ij}$ acquired in the re-encryption key generating process, thereby generating first, second and third re-encrypted data $C_2'$, $C_2''$ and $C_2'''$ as indicated in the following equations.

$$C_2' = X_i^t$$

$$C_2'' = R_{ij}^{1/t} = g^{(x_j/x_i)^{t-1}}$$

$$C_2''' = C_2^t = X_i^{rt}$$

More precisely, the re-encryption unit 15 generates the first re-encrypted data $C_2'$ on the basis of the public key $X_i$ of the user i and the second random number t, generates the second re-encrypted data $C_2''$ on the basis of the re-encryption key $R_{ij}$ acquired in the re-encryption key generating process and the second random number t, and generates the third re-encrypted data $C_2'''$ on the basis of the second encrypted data $C_2$ and the second random number t.

If the verification fails, the process will be terminated.

The re-encrypted text obtained in the re-encryption process described above is a re-encrypted text $C_j = (C_1, C_2', C_2'', C_2''', C_3, C_4, \sigma)$ acquired by substituting the first to third re-encrypted data $C_2'$, $C_2''$ and $C_2'''$ for the second encrypted data $C_2$ contained in the encrypted data $C_i$.

(5) Decryption Process

How the user j decrypts a re-encrypted text will be explained. The decrypting unit 26 verifies the re-encrypted text $C_j$ by using the public parameters, the public key $X_j$ of the user j and the following equations.

$$e(C'_2, C''_2) \stackrel{?}{=} e(X_j, g)$$

$$e(C'''_2, u^{C_1} \cdot v) \stackrel{?}{=} e(C'_2, C_4)$$

$$\hat{V}(C_1, \sigma, (C_3, C_4)) \stackrel{?}{=} 1$$

If the verification ends in success, the decrypting unit 26 uses the private key $x_j$ of the user j, decrypting the re-encrypted text $C_j$ obtained in the re-encryption process and thereby acquiring a message m, as indicated in the following equation.

$$m = C_3 / \left( e(C''_2, C'''_2)^{1/x_j} \right)$$

If the verification fails, the process will be terminated.

Figure 4:
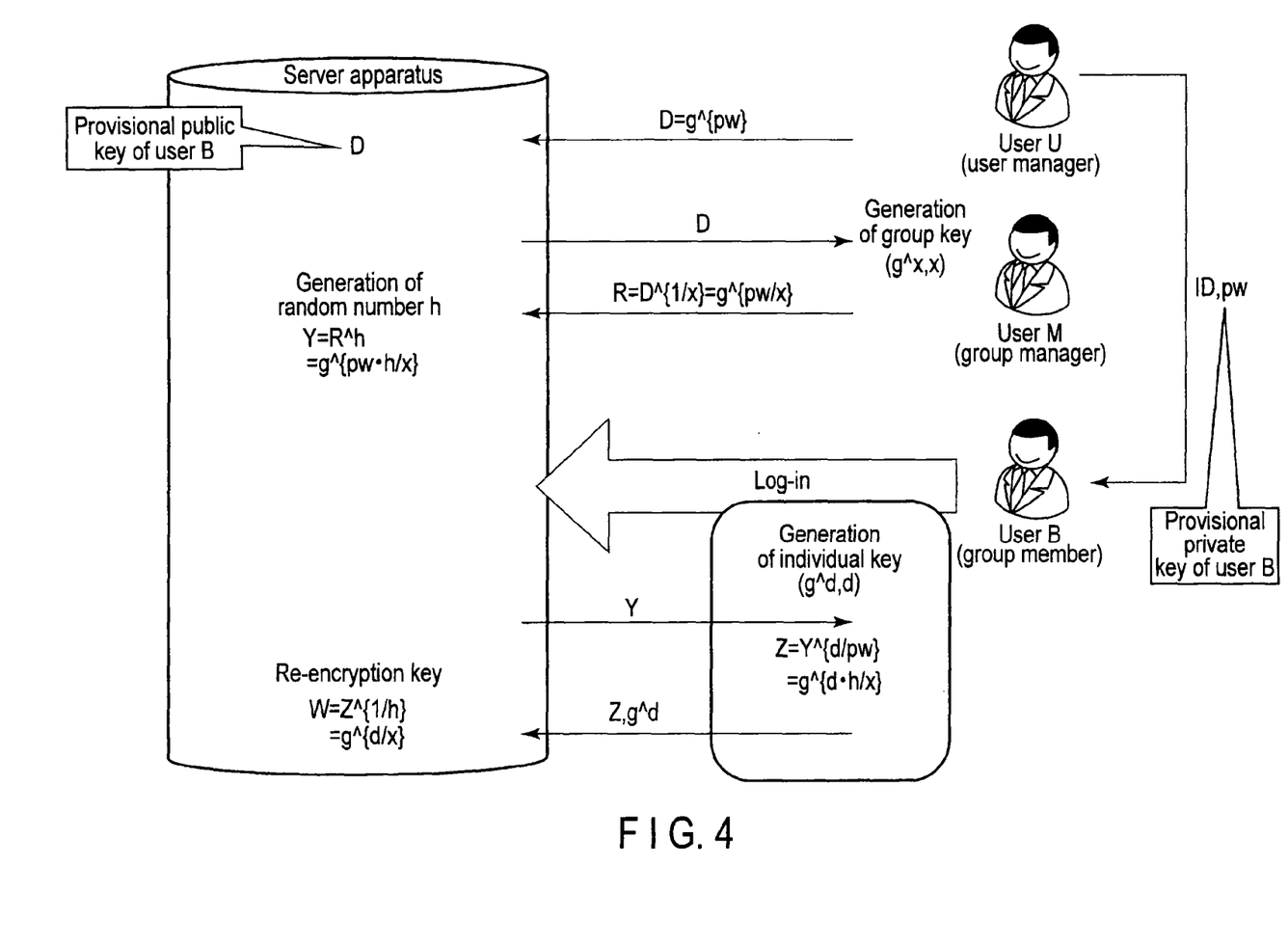
FIG. 4 is a schematic diagram outlining the process of updating the re-encryption key in the embodiment.

The re-encryption key updating process (6) according to this embodiment will be explained. FIG. 4 is a schematic diagram outlining the re-encryption key updating process. Assume that the file sharing system is configured as described with reference to FIG. 2. The user administrator U is the entity that manages all users including the group administrator. The user U, who is the group administrator, issues an ID and initial password to each user of the file sharing system, enabling the user to log-in to the file sharing system. (To the user B, for example, the user U issues an ID and password pw.) The password can be regarded as a provisional private key issued by the user administrator. The group administrator M generates the private key x and public key $g^x$. The process of updating the re-encryption key for re-encrypting the ciphertext addressed to the group administrator M to the re-encrypted text addressed to the user B will be explained below. In this process, the private key pw of the user apparatus B and the public key associated with the private key pw are updated, too.

Figure 5:
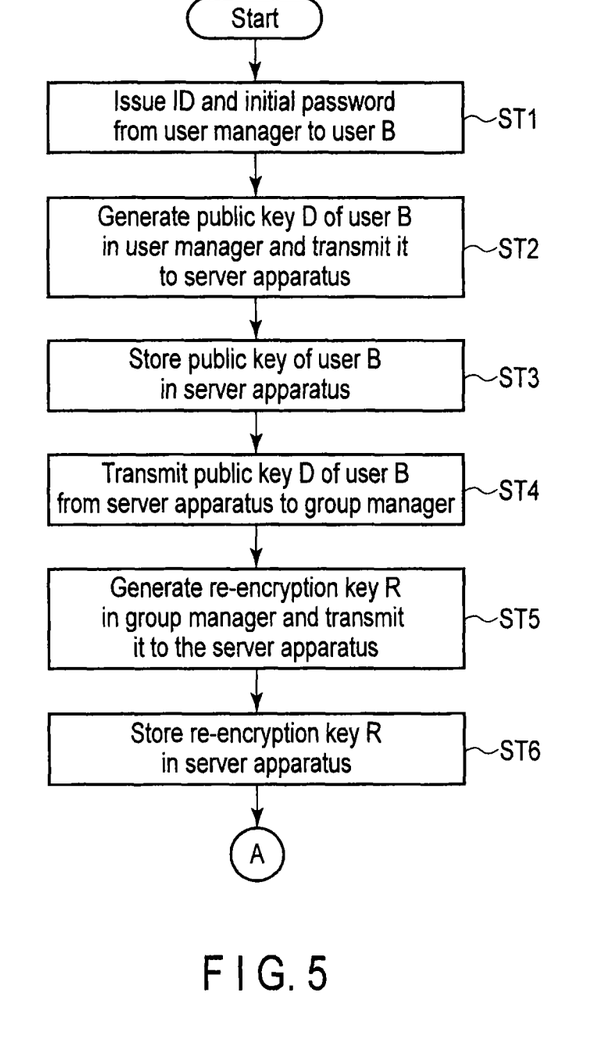
FIG. 5 is a flowchart explaining the process of updating the re-encrypting key in the embodiment.
Figure 6:
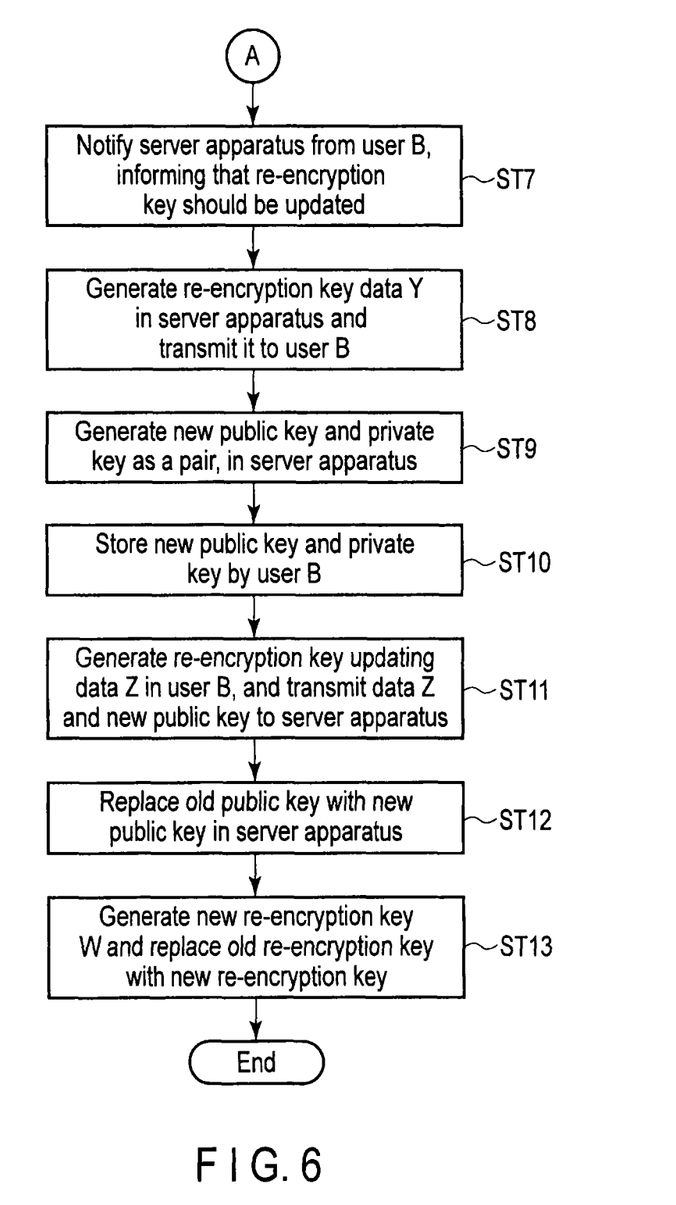
FIG. 6 is a flowchart explaining the process of updating the re-encrypting key in the embodiment.

FIG. 5 and FIG. 6 are a flowchart explaining the process of updating the re-encrypting key.

The user administrator apparatus U issues an ID and initial password to the user apparatus B (Step ST1).

The user administrator apparatus U regards the initial password pw as a provisional private key, generating a provisional public key D associated with the initial password pw by using the following equation, and then transmits the provisional public key D to the server apparatus Sv (Step ST2).

$$D = g^{pw}$$

The server apparatus Sv receives the provisional public key D transmitted from the user administrator apparatus U. The provisional public key D is stored in the public key storing unit 11 (Step ST3).

The group administrator apparatus M that has a pair of the public key and the private key ($g^x$, x) asks the server apparatus Sv to transmit the provisional public key D. The server apparatus Sv therefore transmits the provisional public key D to the group administrator apparatus M (Step ST4). In the group administrator apparatus M, the re-encryption key generating unit 34 uses the following equation, generating a re-encryption key R for re-encrypting the ciphertext addressed to the group administrator apparatus M, into a re-encrypted text addressed to the user apparatus B, and transmits the re-encryption key R to the server apparatus Sv (Step ST5).

$$R = D^{1/x} = g^{pw/x}$$

In the server apparatus Sv, the re-encryption key storing unit 13 stores the re-encryption key R received from the group administrator apparatus M (Step ST6).

As operated by the user B, the user apparatus B uses the ID and initial password issued in Step ST1, logging in to the file sharing system. The user apparatus B then informs the server apparatus Sv that the re-encryption key shall be updated (Step ST7).

The server apparatus Sv obtains the re-encryption key at the re-encryption key storing unit 13. (In the above-described case, the re-encryption key is the re-encryption key R for re-encrypting the ciphertext addressed to the group administrator apparatus M, to a re-encrypted text addressed to the user apparatus B.) Then, the server apparatus Sv generates a random number h at the re-encryption key-data generating unit 16. Using the following equation, the re-encryption key-data generating unit 16 calculate a re-encryption key data Y, which is transmitted to the user apparatus B (Step ST8).

$$Y = R^h = g^{pw \cdot h / x}$$

The user apparatus B generates a pair of a new public key and a new private key ($g^d$, d) at the re-encryption key updating-data generating unit 27 (Step ST9). The private key d is stored in the private key storing unit 21 (Step ST10). The user apparatus B then calculates re-encryption key updating data Z, also at the re-encryption key updating-data generating unit 27, by using the following equation. The user apparatus B transmits the re-encryption key updating data Z and new public key $g^d$ to the server apparatus Sv (Step ST11).

$$Z = Y^{d/pw} = g^{d \cdot h / x}$$

The server apparatus Sv replaces the old public key D with the new public key $g^d$ in the public key storing unit 11, (Step ST12). Further, the server apparatus Sv calculates a new re-encryption key W by using the following equation at the updated re-encryption key generating unit 17, and replaces the old re-encryption key R with the new re-encryption key W at the re-encryption key storing unit 13 (Step ST13).

$$W = Z^{1/h} = g^{d/x}$$

The case described above is based on the assumption that the group administrator participates in the file sharing system for the first time. In the file sharing system explained with reference to FIG. 2, the group administrator needs only to transmit his public key $pk_{Gr}$ to the server apparatus Sv. Therefore, it suffices to perform the following sequence of operations. First, the user administrator U issues an ID and initial password to the group administrator M. The group administrator uses the ID and initial password, logging in to the file sharing system. The group administrator then generates, at the key generating unit 33, a pair of a public key $pk_{Gr}$ and a private key $sk_{Gr}$ (i.e., $g^x$, x) (or has generated the key set beforehand). The private key x ($=sk_{Gr}$) is stored in the private key storing unit 31, and the public key $g^x$ ($=pk_{Gr}$) is transmitted to the server apparatus Sv. The server apparatus Sv stores the public key $g^x$ in the public key storing unit 11. Thus, the user C can obtain, from the server apparatus Sv, the group administrator public key $g^x$ and may use it to generate ciphertext.

To update the re-encryption key again after it has once been updated, the operation may start at Step ST 7. In this case, it suffices to use the initial user private key pw as user private key d not updated yet. The steps shown in FIG. 5 and FIG. 6 need not be performed in the order they are shown. For example, Steps ST9 and Step ST10 may be performed prior to Step ST8, or Steps ST8, Step ST9 and Steps ST10 may be performed at the same time. Moreover, Step ST12 and Step ST13 may be switched in order.

If the re-encryption key is so updated, the group administrator private key x need not be used any longer and the group administrator need not be involved in any step after Step ST6 of the flowchart shown in FIG. 5 and FIG. 6. The re-encryption key can therefore be generated even if the group administrator is absent. Moreover, the secrecy (of the file data) can therefore be preserved with respect to the server apparatus Sv since the group administrator private key x is unknown to the server apparatus Sv. In addition, the risk of leaking the re-encryption key can be suppressed since the re-encryption key (e.g., the re-encryption key W in the case described above) is not notified to the user. Further, the risk of leaking the user private key can be suppressed since the user need not inform any other person of the new private key (e.g., the private key d in the case described above) assigned to him or her. A program having the group administrator's function may be installed in the group administrator's PC operating at all times, making the PC automatically respond and generate the re-encryption key (without updating the re-encryption key as described above), even if the group administrator is absent. In this case, however, the system may be attacked from outside since the PC is always online. Should the system be attacked, the group administrator private key x would be stolen. Nonetheless, the re-encryption key generated can be used in security, without such risk, if it is updated as described above.

In the embodiment described above, the server apparatus Sv generates the random number h on notified by the user apparatus B that the re-encryption key R should be updated. The server apparatus Sv then calculates re-encryption key data Y (=R^h) from the re-encryption key R stored in the re-encryption key storing unit 13 and the random number h generated. The server apparatus Sv transmits the re-encryption key data Y to the user apparatus B, and receives, from the user apparatus B, the re-encryption key updating data Z (=Y^{d/pw}=g^{d·h/x}) calculated from the re-encryption key data Y on the basis of the user private key pw not updated and user private key d updated. The server apparatus Sv then calculates an updated re-encryption key W (=Z^{1/h}=g^{d/x} on the basis of the re-encryption key updating data Z and the random number h mentioned above, and replaces the re-encryption key R stored in the ciphertext storing unit 12 with the re-encryption key W updated. The re-encryption key can thus be updated even if the user key d of the user B is not notified to the group administrator M and if the group administrator M is absent.

[Modification 1]

In the embodiment described above, the server apparatus Sv uses the random number h, obtaining the hth power of the re-encryption key R, thereby calculating re-encryption key data Y, and further obtaining the 1/hth power of Z, thereby calculating re-encryption key W updated. However, the embodiment is not limited to this, the server apparatus Sv may use the random number h, obtaining the 1/hth power of the re-encryption key R, thereby may be calculated re-encryption key data Y', and further obtaining the hth power of Z', thereby may be calculated re-encryption key W updated, as seen from the following equations.

$$Y'=R^{1/h}=g^{pw/x\cdot h}$$

$$Z'=Y'^{d/pw}=g^{d/x\cdot h}$$

$$W=Z'^h=g^{d/x}$$

The modification 1 can thus achieve the same advantage as the embodiment described above.

[Modification 2]

In the embodiment and the modification 1, the server apparatus Sv uses the random number h, calculating the re-encryption key data Y to make the re-encryption key unknown to the user, and transmits the re-encryption key data Y to the user. Instead, the server apparatus Sv may not use the random number h if the re-encryption key can be disclosed to the user. In this case, the re-encryption key data Y or Y' may be replaced by Y'' specified below.

$$Y''=R$$

where R on the right side is the re-encryption key used in the embodiment described above. In modification 2, the server apparatus Sv need not calculate the re-encryption key W used in the embodiment described above and may use, as new re-encryption key W, the re-encryption key updating data Z received from the user.

Since the random number h is not used, the server apparatus Sv need not have the re-encryption key-data generating unit 16 and updated re-encryption key generating unit 17, which use the random number h. The transmitting-receiving unit 14 needs to have two functions only. One function is to transmit the re-encryption key R (=g^{pw/x}) to, for example, the user apparatus B and to receive the updated re-encryption key W (=g^{d/x}) calculated from the new re-encryption key W on the basis of the user private key pw (not updated) and the updated user private key d, when the transmitting-receiving unit 14 is notified by the user B that the re-encryption key R should be updated. The other function is to replace the re-encryption key R stored in the re-encryption key storing unit 13 with the updated re-encryption key W. The storing units 11 to 13 may be of the same type as used in the embodiment described above.

So configured as specified above, the modification 2 can not only achieve the same advantage as the embodiment, but also omit the calculation using the random number h if the re-encryption key R may be known to the user.

Second Embodiment

In the system of "Second Attempt" described in Chapter 3 of G. Ateniese, K. Fu, M. Green and S. Hohenberger, "Improved proxy re-encryption schemes with applications to secure distributed storage," Internet Society (ISOC): NDSS 2005, pp. 29-43, 2005 (hereinafter, referred to as Non-Patent Literature 2), the re-encryption key is established by an equation similar to the equation used in the first embodiment. The process of the "Second Attempt" may therefore be performed in place of the key setup process, encryption process, re-encryption key generating process, re-encryption process and decryption process, all performed in the first embodiment. Then, a technical advantage similar to that of the first embodiment will also be achieved in the system of "Second Attempt" described in Non-Patent Literature 2.

Third Embodiment

Figure 7:
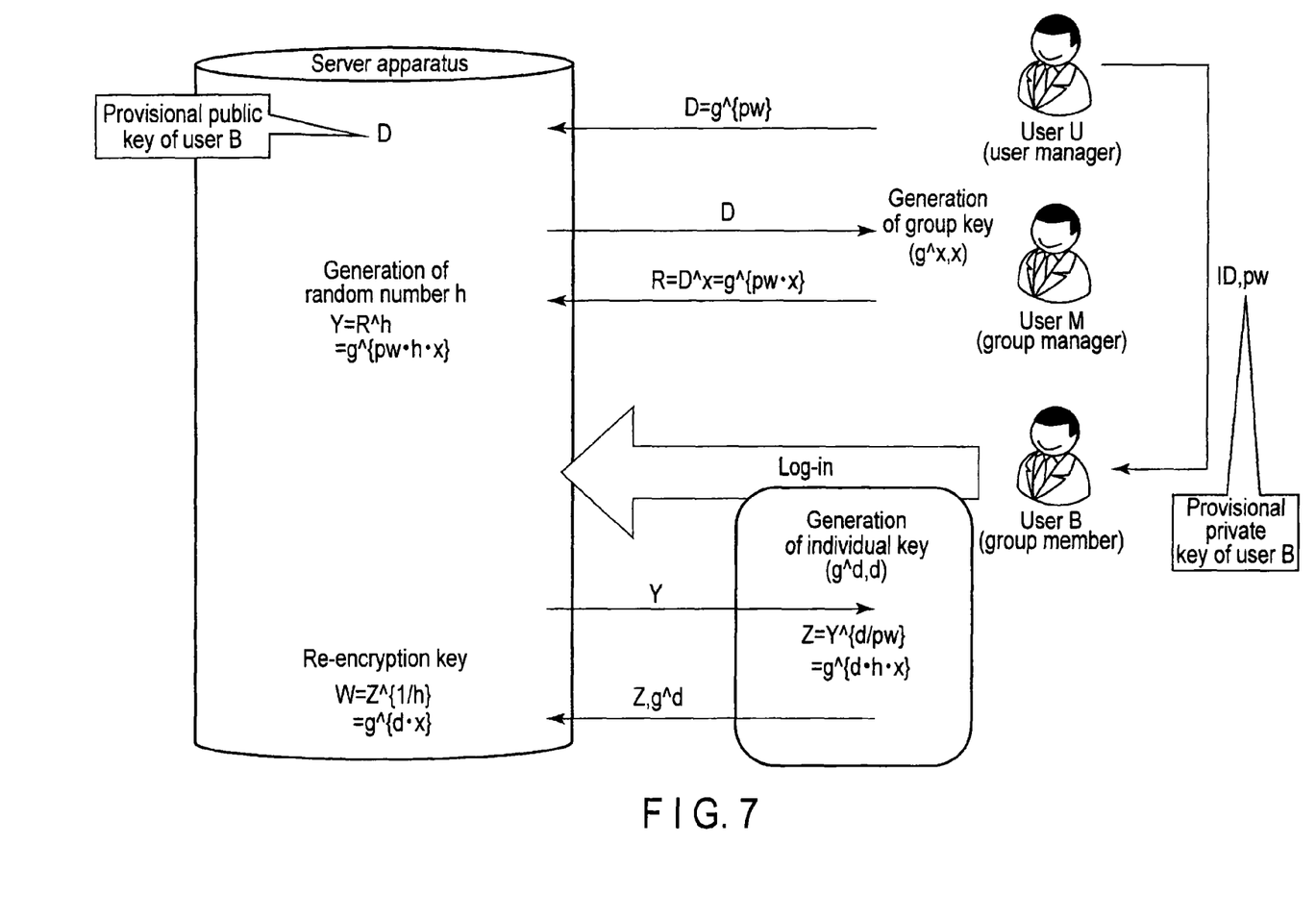
FIG. 7 is a schematic diagram outlining the process of updating the re-encryption key in a third embodiment.

In the system of "Third Attempt" described in Chapter 3 of Non-Patent Literature 2, the re-encryption key assumes the first form of g^{pw·x}, not g^{pw/x} as in the first embodiment. Therefore, the re-encryption key R may be set to D^x (R=D^x) as shown in FIG. 7, and the processes of "Third Attempt" may be performed in place of the key setup process, encryption process, re-encryption key generating process, re-encryption process and decryption process, all performed in the first embodiment. Then, a technical advantage similar to that of the first embodiment will also be achieved in the system of "Third Attempt" described in Non-Patent Literature 2.

Fourth Embodiment

Figure 8:
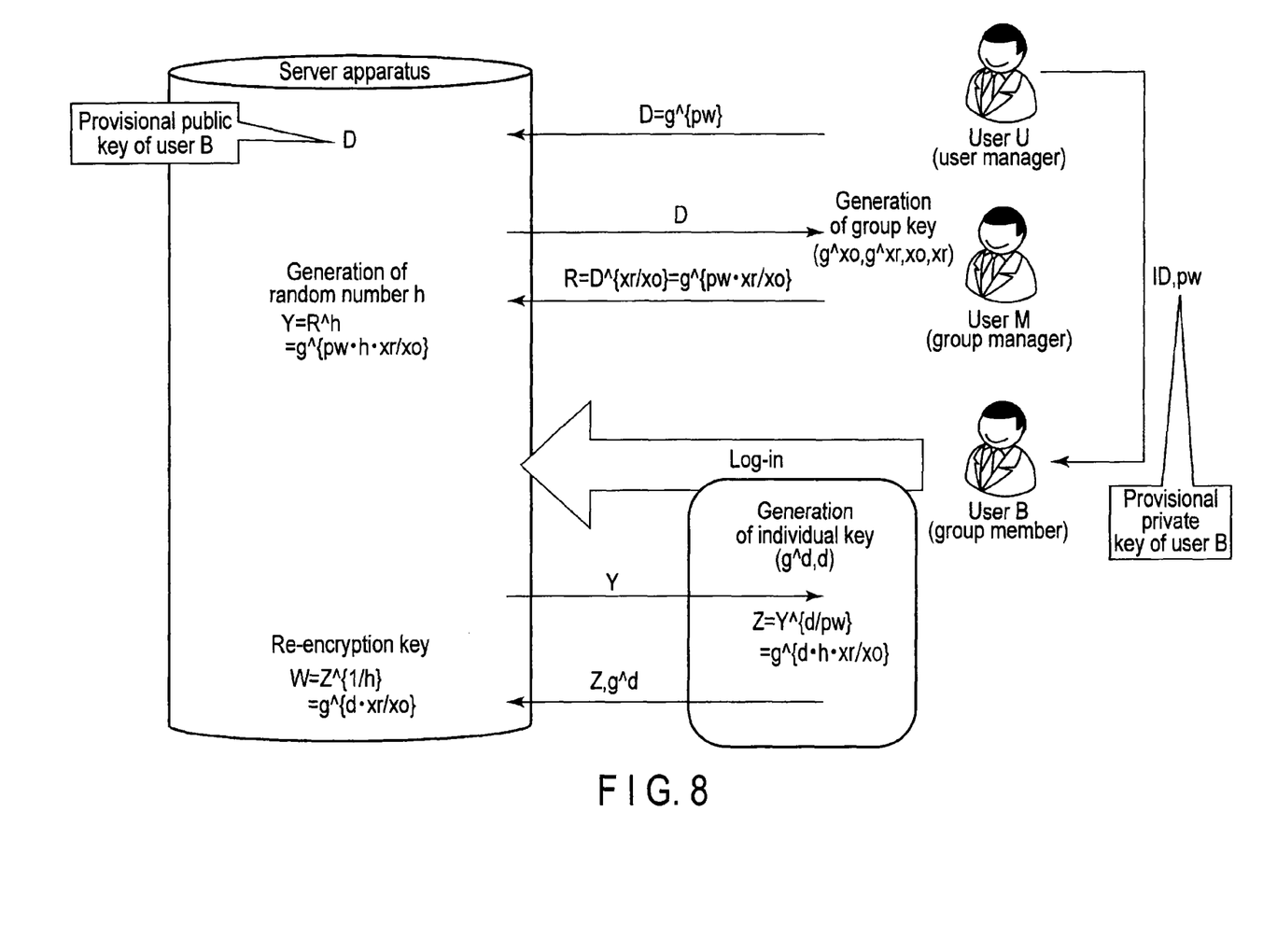
FIG. 8 is a schematic diagram outlining the process of updating the re-encryption key in a fourth embodiment.

In the system of "Temporary Unidirectional Proxy Re-encryption" described in Chapter 3.2 of Non-Patent Literature 2, the re-encryption key assumes the first form of $g\hat{}\{pw \cdot xr/x0\}$, not $g\hat{}\{pw/x\}$ as in the first embodiment. Therefore, the re-encryption key R may be set to $D\hat{}\{xr/x0\}$ as shown in FIG. 8, and the processes of "Temporary Unidirectional Proxy Re-encryption" may be performed in place of the key setup process, encryption process, re-encryption key generating process, re-encryption process and decryption process, all of which are performed in the first embodiment. Then, a technical advantage similar to that of the first embodiment will also be achieved in the system of "Temporary Unidirectional Proxy Re-encryption" described in Non-Patent Literature 2.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A server apparatus configured to re-encrypt ciphertext data obtained by encrypting plain text data with an administrator public key, without decrypting the ciphertext data and to store a re-encryption key for obtaining re-encrypted text data able to be decrypted with user private keys of user apparatuses, the server apparatus comprising:
    a storage device which stores the re-encryption key generated on the basis of an administrator private key associated with the administrator public key, and a user public key associated with a user private key;
    a transmitting/receiving device which transmits the re-encryption key to a user apparatus on receiving from the user apparatus a notification showing that the re-encryption key should be updated, and receives an updated re-encryption key calculated from the re-encryption key on the basis of the user private key not updated and an updated user private key; and
    a replacing device which replaces the re-encryption key stored in the storage device with the updated re-encryption key.

2. A server apparatus configured to re-encrypt ciphertext data obtained by encrypting plain text data with an administrator public key, without decrypting the ciphertext data and to store a re-encryption key for obtaining re-encrypted text data able to be decrypted with user private keys of user apparatuses (A, B, C, . . . ), the server apparatus comprising:
    a storage device which stores the re-encryption key generated on the basis of an administrator private key associated with the administrator public key and a user public key associated with a user private key;
    a first calculating device which generates a random number on receiving from the user apparatus a notification showing that the re-encryption key should be updated, and calculates re-encryption key data on the basis of the re-encryption key stored and the random number generated;
    a transmitting/receiving device which transmits the re-encryption key to a user apparatus and receives, from the user apparatus, the user private key not updated yet and re-encryption key updating data calculated from the re-encryption key data on the basis of an updated user private key; and
    a second calculating device which calculates the re-encryption key updated, on the basis of the re-encryption key updating data and random number, and replaces the re-encryption key stored in the storage device with the updated re-encryption key.

3. A non-transitory computer-readable storage medium storing program code designed to be executed by the processor of a server apparatus storing a re-encryption key for re-encrypting ciphertext data obtained by encrypting plain text data with an administrator public key, without decrypting the ciphertext data, thereby obtaining re-encrypted text data able to be decrypted with user private keys of user apparatuses, the program code comprising:
    a first program code for causing the processor to write, in a storage device of the server apparatus, the re-encryption key generated on the basis of an administrator private key associated with the administrator public key, and a user public key associated with a user private key;
    a second program code for causing the processor to transmit the re-encryption key to a user apparatus on receiving from the user apparatus a notification showing that the re-encryption key should be updated, and to receive an updated re-encryption key calculated from the re-encryption key on the basis of the user private key not updated and an updated user private key; and a third program code for causing the processor to replace the re-encryption key stored in the storage device with the updated re-encryption key.

4. A non-transitory computer-readable storage medium storing program code designed to be executed by the processor of a server apparatus storing a re-encryption key for re-encrypting ciphertext data obtained by encrypting plain text data with an administrator public key, without decrypting the ciphertext data, thereby obtaining re-encrypted text data able to be decrypted with user private keys of user apparatuses, the program code comprising:
- a first program code for causing the processor to write, in a storage device of the server apparatus, the re-encryption key generated on the basis of an administrator private key associated with the administrator public key, and a user public key associated with a user private key;
- a second program code for causing the processor to generate a random number on receiving from the user apparatus a notification showing that the re-encryption key should be updated, and to calculate re-encryption key data on the basis of the re-encryption key stored and the random number generated;
- a third program code for causing the processor to transmit the re-encryption key to a user apparatus and to receive, from the user apparatus, the user private key not updated yet and re-encryption key updating data calculated from the re-encryption key data on the basis of an updated user private key; and
- a fourth program code for causing the processor to calculate the re-encryption key updated, on the basis of the re-encryption key updating data and random number, and to replace the re-encryption key stored in the storage device with the updated re-encryption key.

5. A non-transitory computer-readable storage medium storing program code designed to be executed by the processor of a server apparatus storing a re-encryption key for re-encrypting ciphertext data obtained by encrypting plain text data with an administrator public key, without decrypting the ciphertext data, thereby obtaining re-encrypted text data able to be decrypted with user private keys of user apparatuses, the re-encryption key having been generated on the basis of an administrator private key associated with the administrator public key and a user public key associated with a user private key, said program code comprising:
- a first program code for causing the processor to write, in a storage device of a user apparatus, the user private key not updated yet and associated with the user public key not updated yet and also an updated user private key associated with an updated user public key;
- a second program code for causing the processor to transmit, to the server apparatus, a notification showing that the re-encryption key should be updated, and to receive, from the server apparatus, re-encryption key data calculated on the basis of the re-encryption key and a random number;
- a third program code for causing the processor to calculate updated re-encryption key data from the re-encryption key data, on the basis of the re-encryption key data received, the user private key not updated yet and the updated user private key; and
- a fourth program code for causing the processor to transmit, to the server apparatus, the updated re-encryption key data so calculated, wherein the updated re-encryption key data is data that the server apparatus uses to calculate the updated re-encryption key on the basis of the random number; and the updated re-encryption key has replaced the re-encryption key not updated yet, in the server apparatus, and is stored in the server apparatus.

6. A non-transitory computer-readable storage medium storing program code designed to be executed by the processor of a server apparatus storing a re-encryption key for re-encrypting ciphertext data obtained by encrypting plain text data with an administrator public key of a group administrator apparatus, without decrypting the ciphertext data, thereby obtaining re-encrypted text data able to be decrypted with user private keys of user apparatuses, the re-encryption key having been generated on the basis of an administrator private key associated with the administrator public key and a user public key associated with a user private key, said program code comprising:
- a first program code for causing the processor to write the administrator private key in a storage device of the group administrator apparatus;
- a second program code for causing the processor to generate the re-encryption key on the basis of the user public key and administrator private key received from the server apparatus; and
- a third program code for causing the processor to transmit the re-encryption key to the server apparatus, wherein the re-encryption key is data from which the server apparatus calculates re-encryption key data on the basis of a random number; the re-encryption key data is data from which the user apparatus calculates new re-encryption key data on the basis of the user private key not updated and an updated user private key; the new re-encryption key data is data from which an updated re-encryption key is calculated on the basis of the random number by the server apparatus; and the updated re-encryption key has replaced the re-encryption key not updated yet, in the server apparatus, and is stored in the server apparatus.

* * * * *